May 3, 1932.　　　C. G. MAXWELL　　　1,856,576
STAMPING OR LABELING MACHINE
Filed Dec. 18, 1930　　　8 Sheets-Sheet 1

May 3, 1932.  C. G. MAXWELL  1,856,576
STAMPING OR LABELING MACHINE
Filed Dec. 18, 1930  8 Sheets-Sheet 2

INVENTOR.
CHARLES G. MAXWELL
BY Meyers & Jones
ATTORNEYS.

May 3, 1932. C. G. MAXWELL 1,856,576
STAMPING OR LABELING MACHINE
Filed Dec. 18, 1930 8 Sheets-Sheet 3

INVENTOR.
CHARLES G. MAXWELL
BY Meyers & Jones
ATTORNEYS.

May 3, 1932. C. G. MAXWELL 1,856,576
STAMPING OR LABELING MACHINE
Filed Dec 18, 1930 8 Sheets-Sheet 7

INVENTOR.
CHARLES G. MAXWELL
BY Meyers & Jones
ATTORNEYS

Patented May 3, 1932

1,856,576

UNITED STATES PATENT OFFICE

CHARLES G. MAXWELL, OF RICHMOND, VIRGINIA, ASSIGNOR TO AMERICAN CIGAR COMPANY, OF NEW YORK, N. Y., A CORPORATION OF NEW JERSEY

STAMPING OR LABELING MACHINE

Application filed December 18, 1930. Serial No. 503,307.

The invention relates to a label affixing machine, and more particularly to a machine of this type whereby a label may be firmly pressed against and caused to adhere to a plane surface or surfaces.

In applying and cementing labels to plane surfaces, a proper bonding action may readily be secured by the use of a squeegee roller, providing the surface to which the label is to be attached is fairly smooth and regular. There is, however, always the likelihood of slippage of the label upon this surface because of the successive application of pressure to different limited areas of the label. When applying labels to irregular surfaces such as cigar boxes, the grain of the wood and irregularity in the surface thereof, makes the application of the label extremely difficult. In applying labels to cigar boxes, and by the term label, the end label, internal revenue stamps and the edge binders of such boxes when used are more particularly referred to. There is presented the additional problem of properly folding the label about the edge of the box and subjecting portions upon opposite sides of the edge to a pressure to effect the sealing of the same upon the box.

With the above conditions in mind, the present invention provides a label affixing machine whereby a label having the paste or other cementing medium applied thereto, may be pressed into the desired intimate bonding relation with the surface to which it is to be applied, irrespective of whether this surface, in its entirety, is on the same plane or whether different portions thereof extend at an angle one to the other and by which, instead of the pressure being successively applied to different portions of the label, it is initially applied to an extended area of the label, which area is rapidly so extended as to embrace the entire area of the label without relieving any portion thereof from the cementing pressure. By means of a machine embodying the invention, the label is positively held against slippage during the short interval required for the completion of the application of the label to the box or other article.

While there is a gradual extension of the area of application of the pressure, the machine operates with such rapidity as to be practically instantaneous in its operation.

The construction of the machine is such as to insure an increase of the pressure applied to the label by the presser head with the extension of the area of contact of the head with the label.

The initial application of pressure, however, and the manner of applying the pressure, is such as to secure an effective sealing of the label to the object, during the period of extension of the operative area of the application of pressure by the head. The label, however, is subjected to a final smoothing and rubbing action by a reversal of the operation of the head, but at a very much lesser pressure than is developed during the sealing operation.

The machine of the invention is especially useful in the affixing of labels, as herein defined, about the edge of a container or other object.

Preferably, a machine embodying the invention includes therein, in addition to the presser head, means for applying paste or glue to a label and advancing the label in relation to the head and to the box or other object to which the label is to be applied and mechanisms by which the box or other objects are fed in relation to the label feeding mechanism, and the affixing head. When the presser head is power actuated, the movements of the various mechanisms co-operating with the head are so co-ordinated therewith and with each other so as to permit the operation of the machine at a desired high speed.

The invention consists primarily in a label affixing machine embodying therein a presser head comprising a fitting, oppositely movable arms, pivotably mounted thereon, and a flat expansible member extending between the free ends of said arms; and in such other novel features of construction and combination of parts as are hereinafter set forth and described, and more particularly pointed out in the claims hereto appended.

Referring to the drawings.

Like numerals refer to like parts throughout the several views.

In the accompanying drawings the invention is shown as applied to a hand fed machine embodying therein a presser head and various mechanisms for delivering the hand fed boxes into and from the operative relation to said head, for withdrawing labels from a magazine applying paste thereto, and conveying said labels into the operative relation to the box and to the presser head.

In describing the various mechanisms entering into the machine shown in the drawings, the presser head will first be described and this description will be followed by a detailed description of the box feeding mechanism, the gripper mechanism and the label magazine.

Referring more particularly to Figs. 1 to 4 and 8 of the drawings, said presser head embodies therein a fitting 30 having pivotally connected therewith a plurality of oscillatory arms 31 and 32 so mounted upon parallel axes in relation to each other, as to permit them to swing in opposite directions upon the application of pressure to the fitting 30.

In a machine of the invention, as actually constructed, the arm 31 is relatively longer than the arm 32 and has its upper end rounded as shown. The arm 32 is provided with a heel 33 engageable with a stop 34 upon the fitting 30, and also engageable with the long arm 31.

Acted upon by the lower end of the arms 31 and 32 is an expansible band 35 of a width equal to, or greater than, the width of the label in connection with which the presser head is to be used. Preferably this band is made of a fairly thick, soft vulcanized, highly elastic rubber so that during the affixing of a label the material of the band will not only conform to surface irregularities in the object to which the label is to be affixed, but will be stretched by the movement of the arms 31 and 32 so as to extend the area of application of pressure above referred to.

The manner of mounting the arms 31 and 32 permits the use of an endless elastic band passing about the lower ends of both of said arms, and the upper end of the long arm 31. This arrangement is not essential but is desirable as distributing the stretch of the band throughout a considerable length thereof, and avoiding excessive strains upon that portion of the band between the lower ends of the arms 31 and 32. To minimize likelihood of the breakage of the band, or its undue wear from friction, by the arms 31 and 32, the lower ends of these arms are forked, as shown more particularly in Fig. 8, and mounted in the fork of each arm, is an antifriction roller such as 36 and 37.

The employment of an expansible band permits the extension of the pressure area developed through the head while continuing the pressure applied to every portion of the label in a manner to avoid any possible slippage of the label irrespective of the volume of the paste or glue applied thereto.

The arrangement of the arms 31 and 32 causes the simultaneous application of pressure to the label in opposite directions, which, notwithstanding the friction developed between the band and the label, precludes possibility of slippage of the latter. The friction engendered between the band and the label assists in securing the desired firm adhesion between the label and the box or other article, without likelihood of tearing the label which will be firmly held by the band itself. Furthermore, the expansion of the band progressively distributes the longitudinal stresses throughout substantially the entire surface of the label with which it contacts and thus limits the duration of the application of the stresses upon any part of the label resulting from such frictional engagement.

By using the endless band 35 as described, likelihood of the tearing of labels is practically eliminated because the stretch of the band occurs mainly in portions thereof which are not in contact with the label.

The fitting 30 must have reciprocatory movement in relation to the article to which a label is to be affixed in order to secure the desired mode of operation of the head as a whole. Preferably, said fitting 30 is mounted in a slotted standard 38 and provided with mechanisms for imparting such reciprocatory movement thereto.

Figure 13:
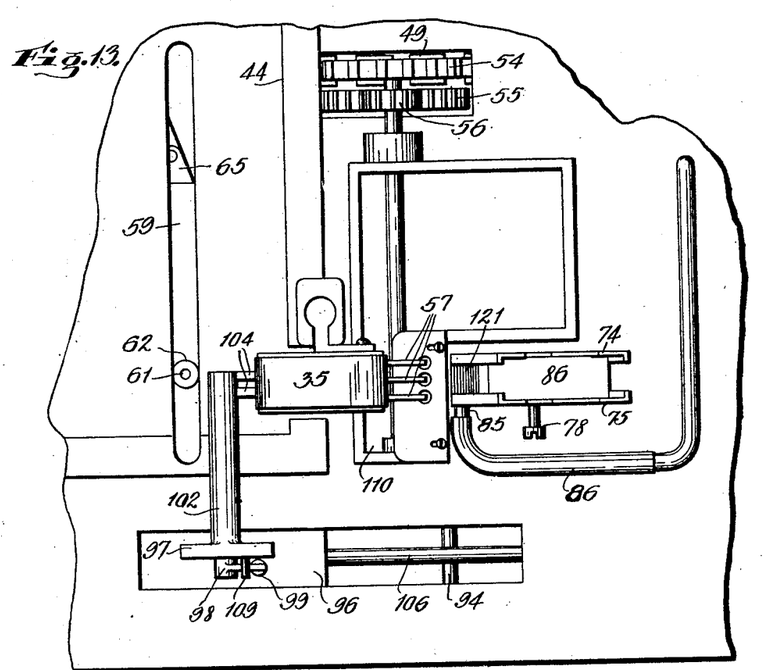
Fig. 13 is a plan view of a fragmentary portion of the machine upon a larger scale adjacent the presser head.
Figure 13A:
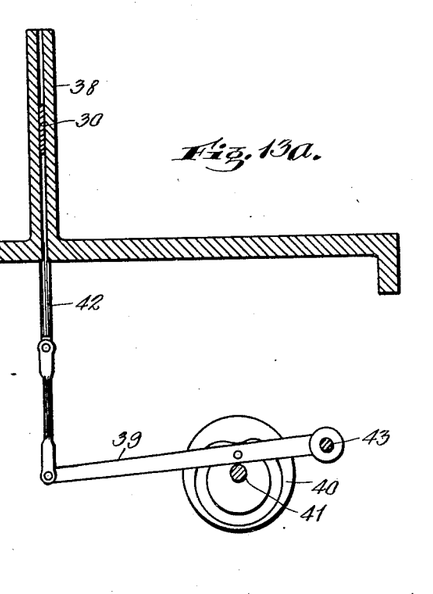
Fig. 13a is a detail sectional view of the pressure head-actuating mechanism.

In the embodiment of the invention shown in the drawings, this operating mechanism (see Fig. 13) comprises a rocking lever 39 acted upon by a housed cam 40 carried by the main power shaft 41 of the machine. Said lever 39 is connected by a link mechanism with the fitting 30. The form of the cam 40 is such as to give the head 30 a rapid reciprocatory movement and to hold it out of the path of movement of co-operating parts until it is desired to bring it into action for the purpose of affixing a label. The lever 39 is pivoted upon the stud 43.

When the pressure head is power actuated as immediately above described, it is desirable, in order to secure the desired speed of operation in the machine, to provide automatically acting means for successively positioning boxes or other articles in relation to the presser head applying paste to the labels, and positioning each in relation to a box as it is brought into operative relation to the head, and removing the boxes from adjacent the head after the label has been affixed thereto.

In the embodiment of the invention shown, the top of the machine adjacent the presser head has a laterally extending channel 44, one flange of which forms a stop locating the forward edge of the box in the proper position in relation to the presser head. Extending from the top plate of the machine from the channel 44 is a channel member 45 having a laterally flared end shown at 46. Mounted in the channel member 45 is a conveyor belt 47, the forward end of which, in the direction of the movement of the boxes thereby, is spaced from the stop flange of the channel 44, a distance greater than the width of the box. This is to afford proper clearance for the ejecting mechanisms.

Figure 15:
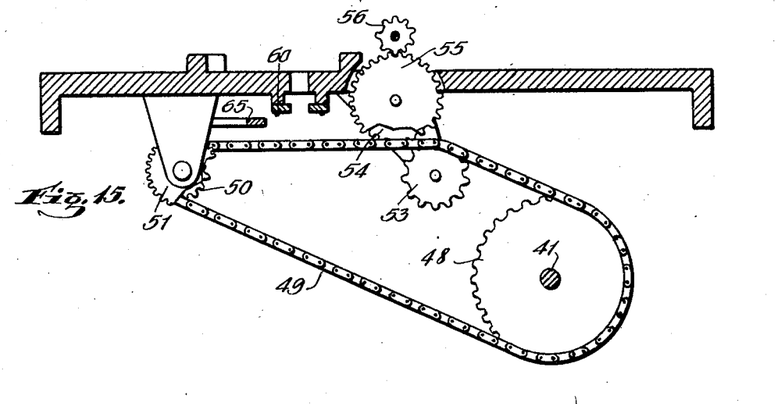
Fig. 15 is a detail view of the actuating mechanism for the conveyor belt and for the paste pot rollers.
Figure 16:
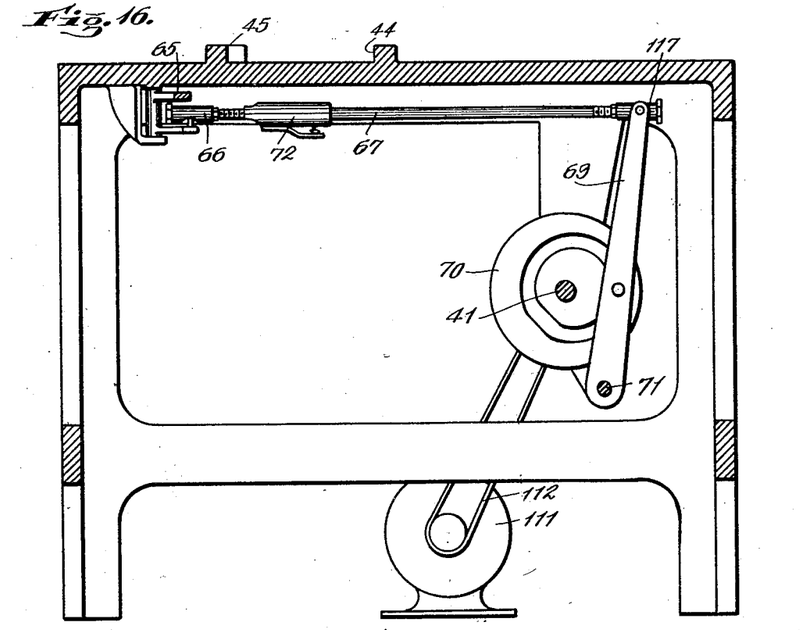
Fig. 16 is a detail view of the actuating means for the box ejecting mechanism.
Figure 25:
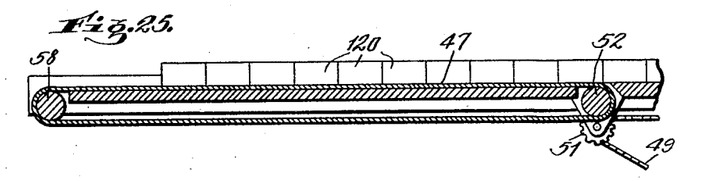
Figs. 25 and 26 are detail sectional views of the conveyor belt mechanism.
Figure 26:
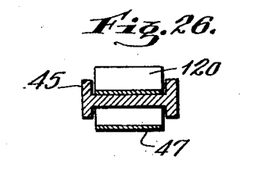

Carried by the main power shaft 41 is a sprocket wheel 48 (see Fig. 15), a chain 49 co-operating with which, passes about a sprocket wheel 50, the shaft of which carries a gear 51 driving the roller 52 of the conveyor belt 47, and also about a takeup sprocket wheel 53 so as to cause the chain 49 to engage a sprocket wheel 54. The shaft of said wheel 54 carries a gear 55 enmeshed with a gear 56 carried by the shaft of paste rollers 57. The idler roller 58 for the conveyor belt (see Fig. 25) is adjacent the flared end 46 of the channel 45.

The shaft 41 is continuously rotated, so that there is a constant tendency of the conveyor belt 47 to impart movement to the boxes thereon, slippage occurring between the belt and the boxes when the operation of the machine requires a box to remain stationary.

Figures 14, 17, 18:
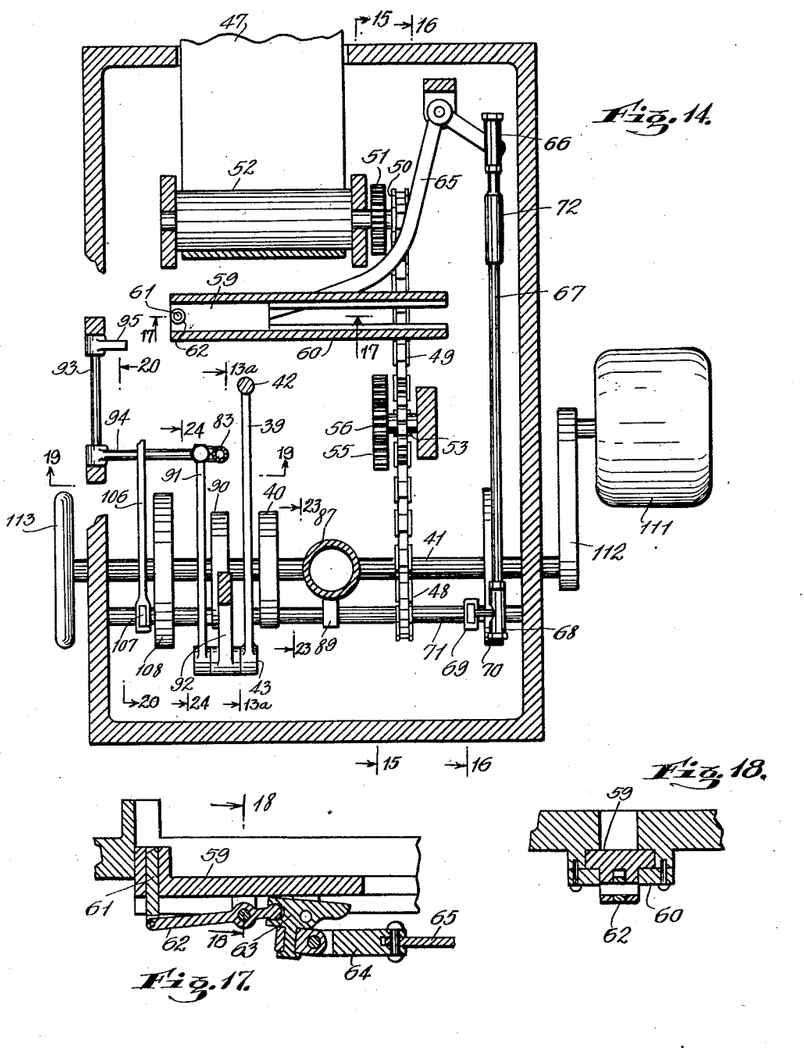
Fig. 14 is a horizontal sectional view showing the relation of the various operating mechanisms adjacent the presser head.
Fig. 17 is a detail sectional view of the slide forming a part of the box ejecting mechanism.
Fig. 18 is a section on the line 18 of Fig. 17.

Operating in timed relation to the other mechanisms in the machine is a box ejecting mechanism. This mechanism comprises a slide 59 mounted in the slideways 60 beneath the top of the machine. Said slide 59 at one end thereof is provided with a vertically reciprocatory finger 61 mounted in a suitable bearing in the slide, which bearing is so positioned as to be below, and out of, the path of movement of the boxes as they are positioned by the conveyor 47. Operative upon the finger 61 is a lever 62, having a short arm acted upon by a rocking plate 63 pivoted beneath the slide 59 (see Fig. 17). The plate 63 is connected by a link 64 with a bell crank lever 65, one arm of which is connected, by means of a universal joint 66, with a link 67, and the other end of which is connected by a universal joint 68 with a lever 69 acted upon by a housed cam 70, carried by the main power shaft 41. Said lever 69 is pivoted upon a tie rod 71. In the length of the link 67 is a slip connection 72 shown in detail in Fig. 27 of the drawings.

The reciprocatory finger 61 is used, and the slot of the cam 70 is formed and set, so that, upon the return movement of the slide 59, said finger will be positioned below the box then being operated upon by the presser head.

The pasting mechanism comprises merely spaced rollers continuously rotated in the usual manner.

Figure 9:
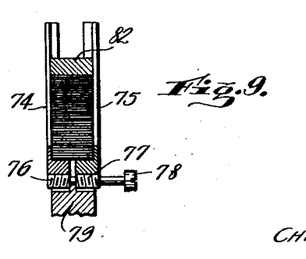
Fig. 9 is a detail cross sectional view of the magazine showing the adjusting means to accommodate the magazine to labels of different widths.
Figure 10:
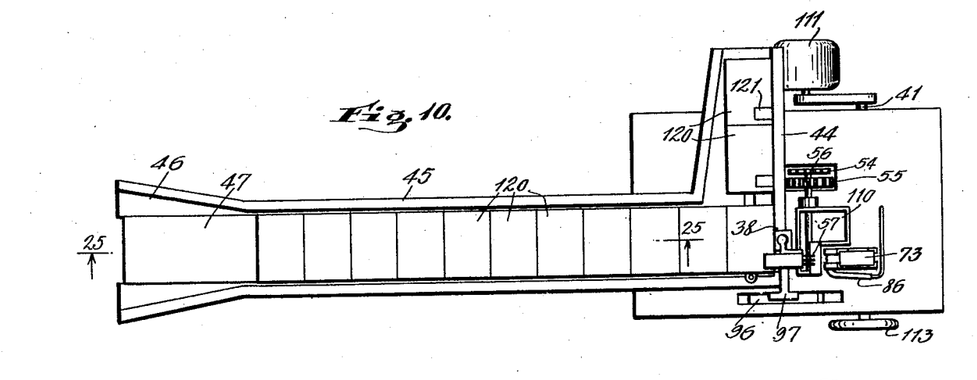
Fig. 10 is a plan view of a complete machine embodying the invention.
Figure 11:
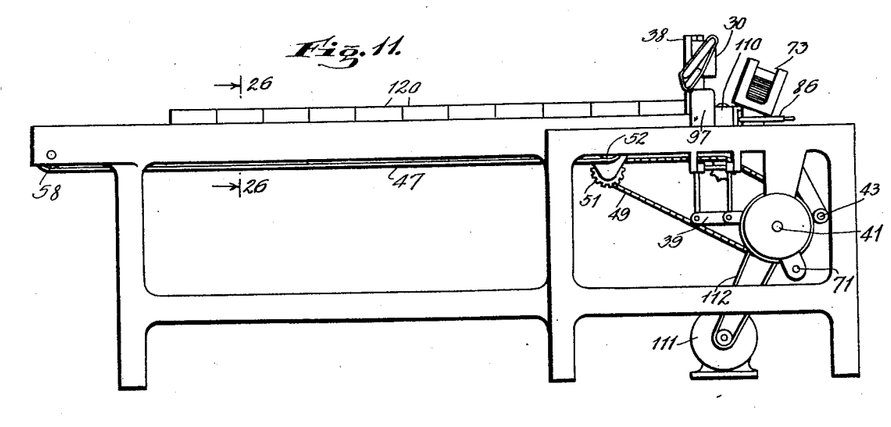
Fig. 11 is a side view thereof.
Figure 12:
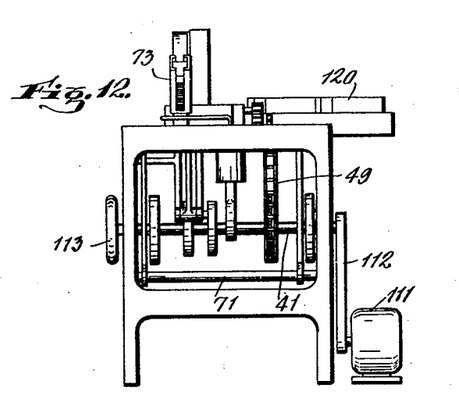
Fig. 12 is an end view from the right of Figs. 10 and 11.

At 73 is shown a label magazine which consists of channelled side plates 74 and 75 held together by means of screw threaded openings in the base thereof co-operating with oppositely pitched threads 76 and 77 upon an adjusting screw 78 by means of which the width of the magazine may be varied to accommodate it to labels varying in width. Said magazine is dovetailed upon a lug 79 projecting from the top plate of the machine, and is set at an angle, as shown, to facilitate the withdrawing of the labels therefrom by a gripper mechanism to be described.

Figure 7:
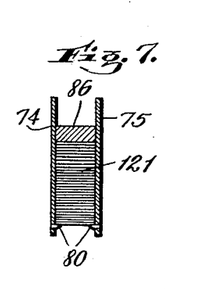
Fig. 7 is a cross section of the magazine showing the retaining pins.

Adjacent the outlet of the magazine are short pins 80 engaging opposite edges of the lowermost label and normally preventing the forward edge of the label from dropping through said outlet. This aids in ensuring the withdrawal of only one label at a time.

Toward the back of the machine, is provided a spur 81 which penetrates some of the lower labels of the stack contained in the magazine and prevents movement of any label excepting that engaged by the gripper jaws.

A weight 82 forces the stack of labels toward the bottom of the magazine.

Positioned below the outlet opening of the magazine is a reciprocatory spring rod 83 carrying, at the top thereof, a suction nozzle 84 adapted to be brought, with the upward movement of the rod 83, in contact with the lowermost label in the magazine at a point spaced from the forward edge of the label so as to afford proper clearance for the action of the grippers which complete the withdrawing operation. It is desirable to have the suction applied along the medial line of the label, and also to grip the label adjacent this line in order to ensure a straight movement of the label. This, of course, is not essential.

Figure 23:
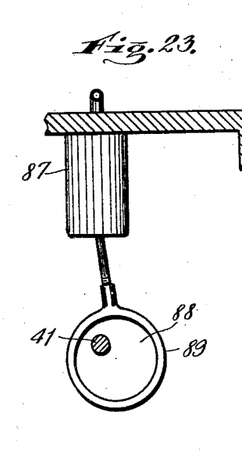
Fig. 23 is a detail view of the suction creating mechanism for withdrawing labels from the magazine.
Figure 24:
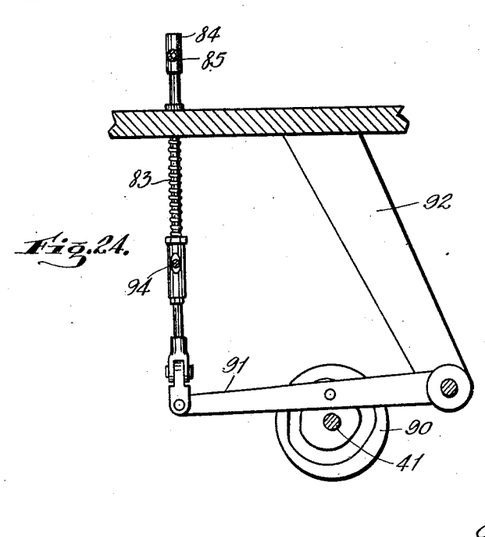
Fig. 24 is a detail view of the actuating mechanism for the suction nozzle.

The nozzle 84 is provided with a nipple 85 by which it is connected by means of a flexible connection 86, with a suction pump 87, the piston of which is actuated by means of an eccentric 88 carried by the main power shaft 41 and an ordinary strap and rod connection 89 between the piston of the suction pump and the eccentric. This pump is of well known construction, and the setting of the eccentric is such as to cause the development of a sub-atmospheric pressure at the nozzle 84 when it is desired to withdraw a label from the magazine and to expel air from the nozzle immediately following the engagement of the grippers with the label so as to avoid interference with the free movement of the label by the grippers.

The spring rod 83 is raised and lowered by means of a housed cam 90 mounted upon the main power shaft 41 and acting upon a lever 91 pivoted upon a bracket 92 depending from the machine top plate.

Figures 19, 20, 21:
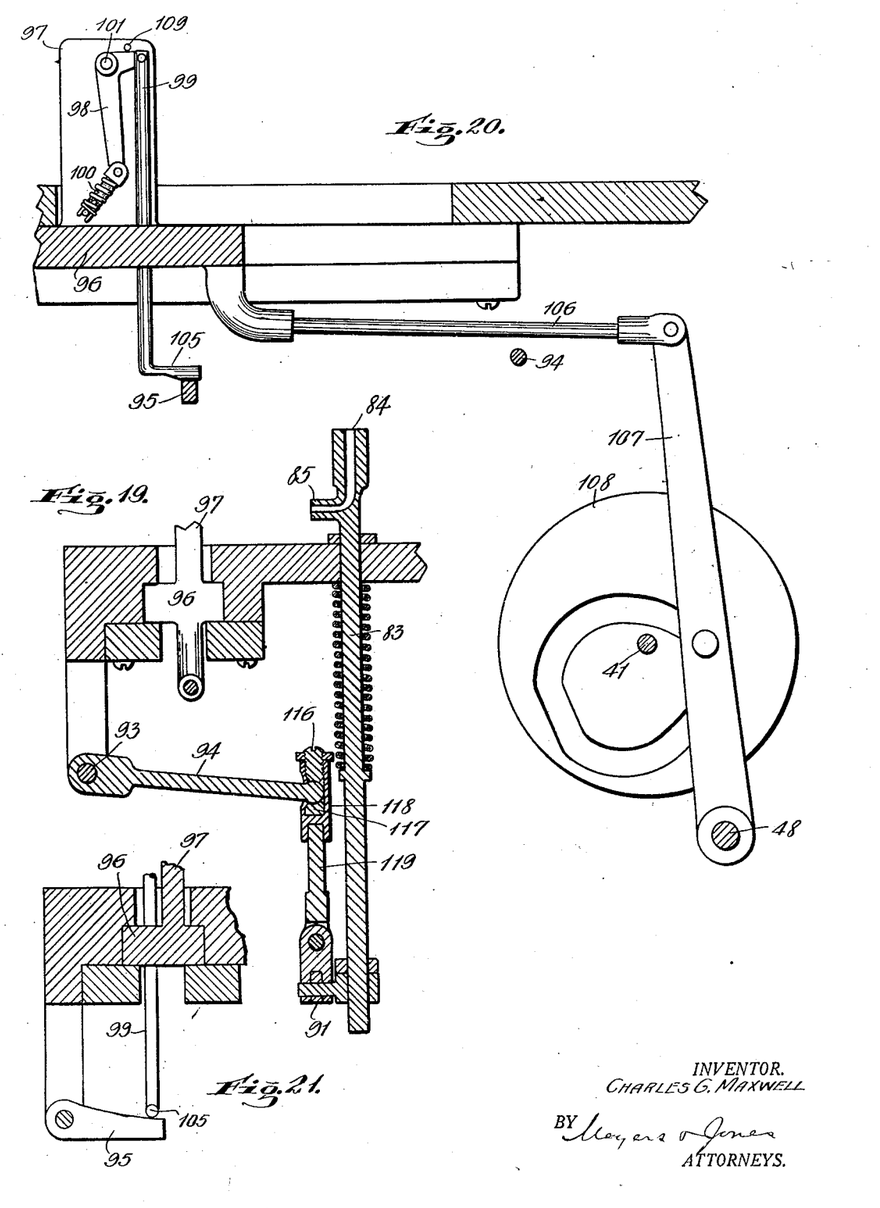
Fig. 19 is a detail view of the actuating mechanism for the grippers and for the suction nozzle co-operating with the label magazine.
Figs. 20 and 21 are respectively a side view and an end view in section of the gripper actuating mechanism.

The lever 91 and cam 90 are also operative to actuate the gripper opening and closing mechanism which consists of a rock shaft 93 having two crank arms 94 and 95, the first of which functions with the downward movement of the suction nozzle 84 to close the gripper jaws, and the other of which is so positioned upon the completion of this downward movement to open the gripper jaws upon the completion of the feeding movement of the label thereby. The operation of this mechanism is more fully described hereinafter. It is noted, however, that the crank arms 94 and 95 are set in different horizontal planes, as shown more particularly in Fig. 20 of the drawings, the arm 94 being upon the higher plane.

The gripper jaw mechanism itself consists of a slide 96 mounted on ways beneath the top plate of the machine and carrying a plate 97 projecting through a slot in said top plate. Mounted upon this plate 97 is a bell crank lever 98, one arm of which has connected therewith an actuating rod 99, and the other arm of which is acted upon by a spring toggle 100, the function of which is to hold the bell crank lever in a position with the gripper jaws either open or closed, as the case may be.

Figures 8, 22:
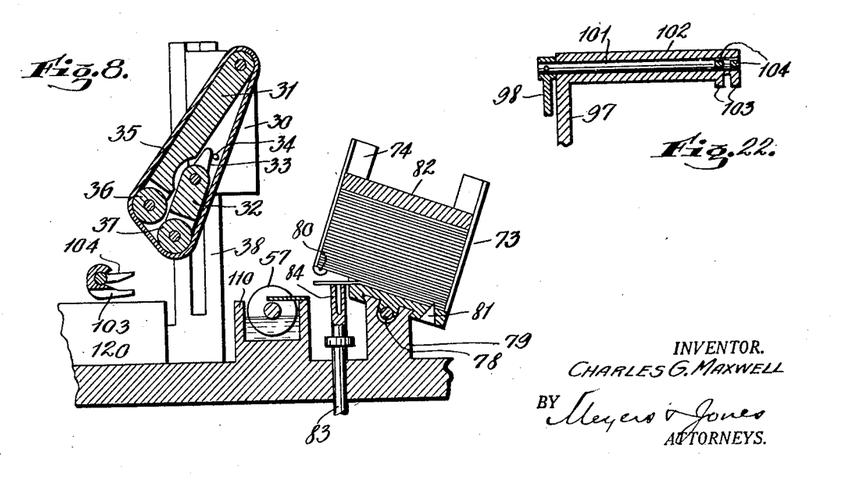
Fig. 8 is a sectional view showing the relation of the label magazine, the gripper mechanism, the paste pot and the presser head to each other.
Fig. 22 is a detail view of the gripper mechanism.

The bell crank lever 98 is carried by a shaft 101 mounted in an elongated bearing 102 having formed thereon fixed gripper jaws 103 spaced in relation to each other, as shown more particularly in Fig. 22. This shaft 101 carries movable gripper jaws 104 co-operating with the fixed jaws 103.

The rod 99 is slidably mounted in the slide 96 and is provided, at the bottom thereof, with a laterally projecting cam 105. The slide 96 is actuated by means of the rod 106, one arm of which is connected therewith and the other arm of which is pivotally connected with a rocking lever 107 actuated by a cam 108 carried by the power shaft 41 and pivoted upon the tie rod 48. This lever has a long throw, being in fact the longest movement of the machine, with the exception of the movement of the slide 59 of the ejecting mechanism.

The crank arms 94 and 95 are spaced apart a distance approximating the full feeding movement of the gripper slide 96.

Action of the spring toggle in one direction is limited by the stop pin 109 and in the other closing direction by the gripper jaws.

The paste pot is shown at 110.

Power is applied to the shaft 41 by means of the motor 111 and a belt and pulley connection 112, said shaft also being provided with a hand wheel 113 by means of which the machine may be hand operated or hand set preparatory to power operation.

It will be noted that all of the cams applying power to the different co-operating mechanisms are mounted upon the same shaft, thus ensuring absolute accuracy in the timing of the different operations, which is essential with a high speed machine.

Figure 27:
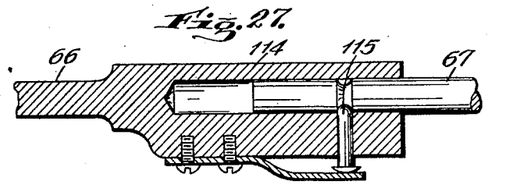
Fig. 27 is a detail view of the slip connection, forming a part of the box ejecting mechanism.

The slip connection arranged in the length of the rod 67, as shown in Fig. 27 of the drawings, comprises a socket member 114 having mounted thereon a spring pressed plunger 115, having a rounded end fitting a groove in the rod 67.

Figure 28:
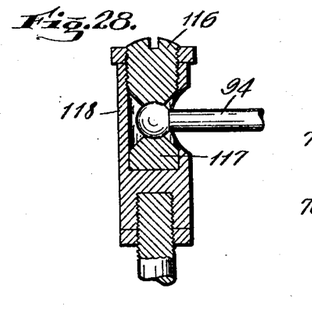
Fig. 28 is a detail view of the universal connection used in different actuating mechanisms.

The universal connection shown in Fig. 28 of the drawings consists of opposed socket members 116 and 117 carried by a sleeve 118, which socket members are adapted to receive a ball formed upon the end of the lever co-operating with this universal connection. Such a universal joint forms a part of the link connection 119 between the lever 91 and the arm 94. The connections 66 and 68 are of the same construction.

In the accompanying drawings, the construction of the machine is such as to adapt it to the affixing of labels upon cigar boxes which are shown at 120. The labels are shown at 121.

In describing the operation of the machine, reference will be made particularly to the embodiment of the invention shown in the drawings, although it is obvious that this is subject to a wide range of variation to adapt the machine to use upon different objects of different shapes and sizes.

Cigar boxes 120 are fed by hand, or in any other desired manner, to the conveyor belt 47, the boxes accumulating upon this belt and being advanced along the channel 45 until the forward box engages the flange of the channel 44 with its forward edge properly positioned below the presser head, as shown more particularly in Fig. 1 of the drawings.

Before starting the run of the machine, the channel 45 should be so filled with boxes as to avoid the possibility of wastage as a result of the feeding and pasting of the labels without applying them to a box.

With each full rotation of the power shaft 41, there is a sequence of operations, parts of some of which occur concurrently. The full cycle of operation of the machine is substantially as follows:—

When the machine is at rest, the suction nozzle 84 is in its lowermost position, the piston of the suction pump 87 is in its uppermost position, the slide 96 is at the extreme limit of its movement away from the presser head, and the slide 59 of the ejector mechanism is spaced from, but adjacent one side flange of the channel 45. With the parts in such a position, the bell crank lever 98 is in the position shown in Fig. 20, the spring toggle 100 and the stop pins 109 holding this lever in this position with the movable gripper jaws 104 spaced away from the fixed gripper jaws 103. With the continued movement of the shaft 41, the slide 96 is advanced toward the presser head, with the gripper jaws in the open position. During this movement, the rod 83 is raised so as to bring the suction nozzle 84 within the operative range of the lowermost label in the label magazine, and the slide 59 continues its movement toward the flange of the channel 45 until it has passed the box below the presser head. The elongated bearing 102, during movement of the slide 96, passes over the top of the box 120.

As the gripper jaws approach the magazine, the direction of movement of the rod 83 and its suction nozzle 84 is reversed. Prior to this reversal, however, the pump 87 has been actuated to develop sufficient sub-atmospheric pressure to cause downward movement of the suction nozzle to withdraw the forward edge of the lowermost label through the outer opening in the pump of the magazine. During this downward movement, the gripper jaws span the edge of the label and the cam 105 is positioned beneath the arm 94, so that with a continued downward movement of the spring rod 83, the bell crank lever 98 is actuated by the rod 99 to close the gripper jaws upon the label, movement of the spring toggle 100 yieldably holding the jaws closed. Substantially simultaneously with this closing of the gripper jaws, the suction pump 87 is reversed forcing air from the nozzle 84 in a manner to separate the label from the nozzle. The action of the suction nozzle draws a label 121 from the magazine, causing the curling of the edges thereof in a manner to pass the pins 80, the spur 81, however, preventing any sliding movement of the label.

Figure 6:
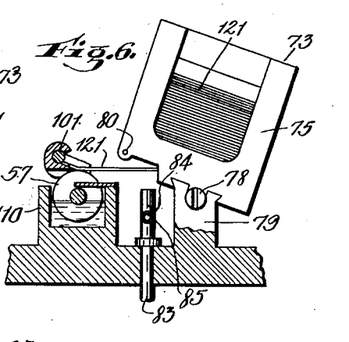
Fig. 6 is a similar view showing the magazine in elevation with the label withdrawing mechanism in its inoperative position.

The form of the gripper jaws is such as to give a slight upward turn to the forward edge of the label 121, as shown more particularly in Fig. 6, so as to avoid application of paste to the top surface of the label. After the gripper jaws engage the forward edge of the label, the direction of movement of the slide 96 is reversed, the grip of the jaws upon the label being sufficiently strong to pull the label from the magazine, notwithstanding the action of the spur 81. This spur, however, will grip the label next above that which is being withdrawn by the grippers, and thus limit the action of the grippers to the withdrawal of a single label. In passing the paste rollers 57, paste is applied to the underside of the label.

During the return or feeding movement of the gripper slide 96, all of the other mechanisms in the machine will be at rest or returning to their normal position of rest.

As the gripper mechanism approaches the limit of its return movement, the lever 39 receives a short reciprocatory movement to bring the presser head into its operative relation to the label 121 withdrawn from the magazine as above described, and cause its actuation in a manner to affix the label to the box or other object. Substantially simultaneously with the engagement of the band 35 with the label, the cam 105 engages the crank 95 and thus rocks the bell crank lever 98 in a manner to open the gripper jaws and cause a manner to release the label, which at this time is held in position in relation to the box or other object by the engagement of the band 35 therewith.

The operation of the presser head is a very short operation, and immediately following the return movement of the presser head, sufficient to disengage it from the label, the lever 69 is actuated to rock the lever 65 and move the slide 59 transversely of the channel 45 and along the channel 46 so as to move the box or other object from below the presser head. As power is applied to the lever 65, its initial oscillation will rock the plate 63 and thus oscillate the lever 62 in a manner to raise the pin 61 above the top plate of the machine into a position where it will engage the end of the box or other object. The movement of the slide is sufficient to provide clearance at the end of the channel 45 for the succeeding box or other object, which is immediately advanced to beneath the presser head by the conveyor belt. Upon the reversal of the direction of movement of the lever 65, the plate 63 receives a reverse rocking movement which through the lever 62 draws the finger 61 to its normal position below the plane of the top plate, thus permitting a return reciprocatory movement of the slide 59 without interfering with the feeding movement of the boxes or other objects by the conveyor belt.

With each revolution of the shaft 41, the above cycle of operation is repeated, a label being affixed to a box with each rotation of the shaft 41.

Having described the operation of the machine shown in the drawings, in its entirety, there will now follow a description in detail of the operation of the presser head.

Figures 1, 2, 3, 4, 29:
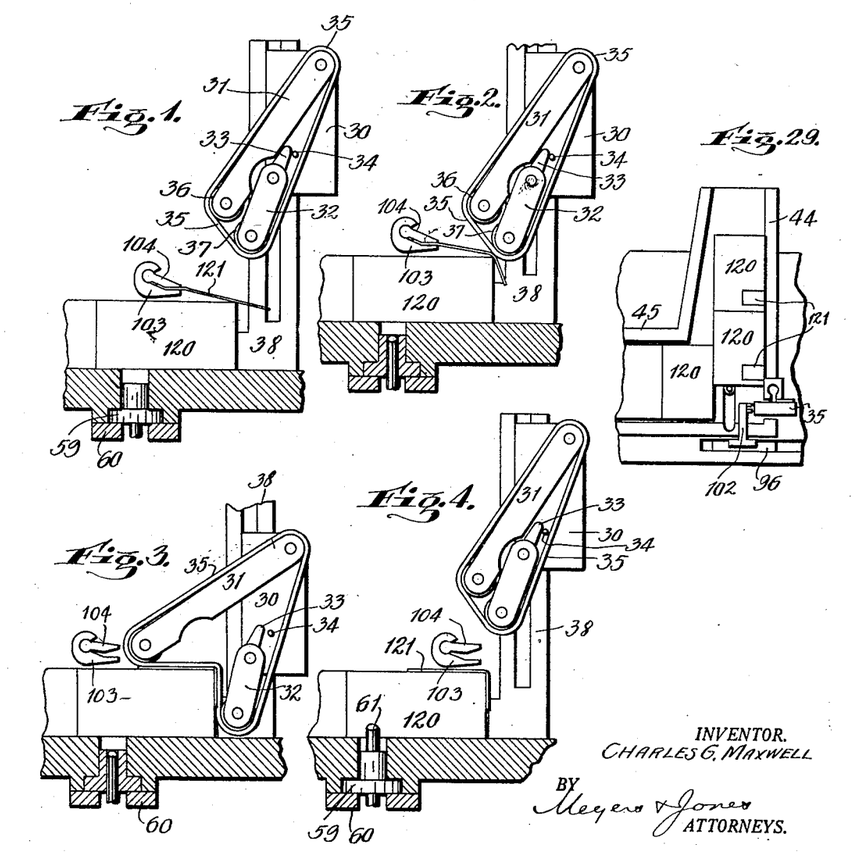
Fig. 1 is a side view of the presser head with the parts shown in their inoperative position.
Fig. 2 is a similar view showing the relation of parts upon the initial application of pressure to a label upon a box.
Fig. 3 is a view showing the relation of parts when all parts of the label are subjected to pressure.
Fig. 4 is a view similar to Fig. 1 showing the relation of parts upon the completion of the label affixing operation.
Fig. 29 is a plan view of a fragmentary portion of the machine, illustrating the operation of the box ejecting mechanism.
Figure 5:
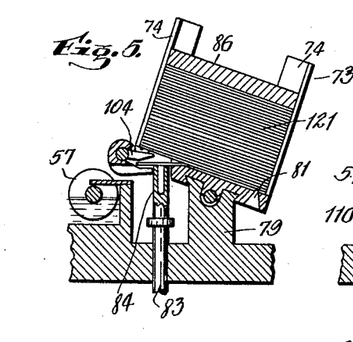
Fig. 5 is a sectional view of the label magazine and parts co-operating therewith for withdrawing the labels therefrom, while in their operative position, the relation of the gripper jaws to the magazine and a portion of the paste pot.

Referring more particularly to Figs. 1 to 3 of the drawings, it will be noted that the presser head remains in its inoperative, elevated position until the label has been fed by the gripper jaws and positioned in relation to the box, as shown in these figures. Substantially simultaneously with the parts reaching the position shown in Fig. 1, the plate 30 is moved rapidly downward.

It will be noted that the lower end of the short arm 32, in the embodiment of the invention shown, is in advance of the lower end of the long arm 31, and that the periphery of the roller extends slightly beyond the vertical side of the box. Consequently, the portion of the expansible band 35 adjacent the roller 37 engages the label at the corner of the box.

Since the band 35 is of soft vulcanized, fairly heavy, elastic rubber, it will not only grip the label firmly at the corner of the box, but will be compressed in a manner to instantly conform to the edge of the box and apply a heavy pressure to the label at this point. With a slight continued downward movement of the presser head, the arm 32 is rocked slightly about its pivot so as to allow the roller 37 to pass the edge of the box. This will occur substantially simultaneously with the engagement of the band 35 passing about the lower end of the long arm 31 with the label at a point more or less remote from the edge of the box.

Following the engagement of the band at the lower end of the arm 31 with the label, there is a rapid separation of the arms 31 and 32 resulting in stretch of the band without, however, any sliding movement thereof in relation to the label beyond that incidental to the stretching action thereof. This will be distributed throughout the entire length of the band operative upon the label, and thus be reduced to a minimum without possibility of concentration of strains at any point of the label. The initial engagement of the band 35 with the label is throughout a limited area. With the continued descent of the presser head, however, and the movement of the arms 31 and 32, the area of contact is progressively increased, and yet at all times all portions of the label with which the band has contacted are subjected to a continuing pressure from the band.

The elasticity of the portion of the band between the lower ends of the arms 31 and 32 develops sufficient pressure to ensure a desired intimate contact between the band and the label. The resiliency of the material of the band, however, causes it to conform to all irregularities in the surface of the box and force the label within such irrgularities.

The band has a normal tendency to restore and maintain the arms to their normal position, as shown in Figs. 1 and 4, and is the only means employed for this purpose, although if desired additional means may be employed, although such is not necessary nor desirable.

To secure this condition the band is placed under slight stretch in applying it to the head. In fact, by using an endless band in the manner shown, a quick replacement of the band may be made in the event of its breakage or of its becoming soiled as a result of extrusion of paste about the edges of the label.

The use of the endless band is preferable for the above reasons as well as for the reason that during the separation of the arms 31 and 32 slippage may occur between the rollers 36 and 37 and the band, in a manner to distribute the stretch throughout all portions of the band and thus reduce the quantity of movement of any portion of the band in relation to the label, or the rubbing effect resulting from the expansion of the band.

The quantity of stretch of the band is not sufficient to develop any material lateral stresses upon the label as a result of the attenuation of the band due to its longitudinal stretch.

This tendency of the portion of the band passing about the lower ends of the arms 31 and 32 to close the arms will continue upon the reversal of the direction of movement of the presser head, thus maintaining the band in engagement with the label until the position of parts has returned to that shown in Fig. 2, whereupon the affixing of the label is completed.

It will be noted that, except upon the initial application of pressure by the arm 32 for setting the label in relation to the box or other article, the pressure developed results from the resistance to movement of the arms 31 and 32 by the expansion of the band 35. Hence the developed pressure may be controlled by the degree of resiliency inherent to said band 35.

The essential element of the machine herein described is the presser head mechanism, and it is intended to claim such broadly.

It is not the intention of the inventor to limit the invention to the precise details of construction shown in the drawings, it being apparent that such may be varied without departing from the spirit and scope of the invention.

Having described the invention, what is claimed as new and desired to have protected by Letters Patent, is:—

1. A label affixing machine embodying therein a presser head comprising a fitting, a long and a short arm pivotally mounted upon said fitting to have movement about parallel axes, a flat expansible and contractible member extending between the free ends of said arms, and a stop member operative upon one of said arms for establishing a normal inoperative relative position of both of said arms.

2. A label affixing machine embodying therein a presser head comprising a fitting, a long and a short arm pivotally mounted upon said fitting to have movement about parallel axes, a band of thick, soft vulcanized, highly elastic rubber extending between the free ends of said arms, and a stop member operative upon one of said arms for establishing a normal inoperative relative position of both of said arms.

3. A label affixing machine embodying therein a presser head comprising a fitting, a long and a short arm pivotally mounted upon said fitting to have movement about parallel axes, an endless thick elastic band passing about both of said arms and extending between the free ends thereof, and a stop member operative upon one of said arms for establishing a normal inoperative relative position of both of said arms.

4. A label affixing machine embodying therein a presser head comprising a fitting, a long and a short arm pivotally mounted upon said fitting to have movement about parallel axes, a flat expansible and contractible member extending between the free ends of said arms, a stop carried by said fitting, and a heel carried by said short arm in engageable relation with said stop and with said long arm.

5. A label affixing machine embodying therein a presser head comprising a fitting, a long and a short arm pivotally mounted upon said fitting to have movement about parallel axes, the lower end of each of said arms being forked, a roller mounted in the forked end of each arm, an endless, thick elastic band passing about both of said arms and between both of said rollers, and a stop member operative upon one of said arms for establishing a normal inoperative relative position of both of said arms.

6. A label affixing machine embodying therein a presser head comprising a fitting, oppositely movable arms pivotally mounted thereon, a flat expansible member extending between the free ends of said arms, a feeding mechanism for delivering objects to be labeled properly positioned in relation to said presser head, a pasting mechanism, a label magazine, a gripper mechanism operative to remove labels from said magazine, subject them to said pasting mechanism and deliver them in the operative relation to said presser head, and ejecting means operative to remove objects from the operative relation to said presser head after labels have been applied thereto.

7. A label affixing machine embodying therein a presser head comprising a fitting, oppositely movable arms pivotally mounted thereon, a flat expansible member extending between the free ends of said arms, a feeding mechanism for delivering objects to be labeled properly positioned in relation to said presser head, a pasting mechanism, a label magazine set at an angle and having an outlet through the bottom thereof, a reciprocatory suction nozzle, means alternately creating subatmospheric pressure in said nozzle and relieving such pressure, a reciprocatory gripper mechanism co-operating with said nozzle for completing the withdrawal of labels from said magazine, subject them to said pasting mechanism and deliver them in the operative relation to said presser head, and ejecting means operative to remove objects from the operative relation to said presser head after labels have been applied thereto.

8. A label affixing machine embodying therein a presser head comprising a fitting, oppositely movable arms pivotally mounted thereon, a flat expansible member extending between the free ends of said arms, a feeding mechanism for delivering objects to be labeled properly positioned in relation to said presser head, a pasting mechanism, a label magazine, a slide having an upwardly projecting plate, a laterally extending bearing carried by said plate having fixed gripper jaws formed thereon, a shaft mounted in said bearing carrying gripper jaws co-operating with said other gripper jaws, means operative upon said gripper jaw shaft including a reciprocatory rod having a projecting cam thereon, a rock shaft having crank arms set upon different horizontal planes and so spaced as to be operative upon said cam to cause a timely closing and opening of the gripper jaws, means imparting timely movement to sad rock shaft, and ejecting means operative to remove objects from the operative relation to said presser head after labels have been applied thereto.

9. A label affixing machine embodying therein a presser head comprising a fitting, oppositely movable arms pivotally mounted thereon, a flat expansible member extending between the free ends of said arms, a feeding mechanism for delivering objects to be labeled properly positioned in relation to said presser head, a pasting mechanism, a label magaine set at an angle and having an outlet through the bottom thereof, a reciprocatory suction nozzle, means alternately creating subatmospheric pressure in said nozzle and relieving such pressure, a slide having an upwardly projecting plate, a laterally extending bearing carried by said plate having fixed gripper jaws formed thereon, a shaft mounted in said bearing carrying gripper jaws co-operating with said other gripper jaws, means operative upon said gripper jaw shaft including a reciprocatory rod having a projecting cam thereon, a rock shaft having crank arms set upon different horizontal planes and so spaced as to be operative upon said cam to cause a timely closing and opening of the gripper jaws, means imparting timely movement to said rock shaft, and ejecting means operative to remove objects from the operative relation to said presser head after labels have been applied thereto.

10. A label affixing machine embodying therein a presser head comprising a fitting, oppositely movable arms pivotally mounted thereon, a flat expansible member extending between the free ends of said arms, a channel extending transversely of the machine, a second channel communicating with said first named channel and extending longitudinally of the machine, a conveyor mechanism including a belt in said last named channel, whereby a plurality of objects to be labeled may be accumulated, and delivered, one at a time, in the operative relation to said presser head, a pasting mechanism, a label magazine, a gripper mechanism operative to remove labels from said magazine, subject them to said pasting mechanism and deliver them in the operative relation to said presser head, and ejecting means operative to move objects, after they have been labeled, along said transverse channel and out of the path of movement of other objects in said longitudinally extending channel.

11. A label affixing machine embodying therein a presser head comprising a fitting, oppositely movable arms pivotally mounted thereon, a flat expansible member extending between the free ends of said arms, a channel extending transversely of the machine, a second channel communicating with said first named channel and extending longitudinally of the machine, a conveyor mechanism including a belt in said last named channel, whereby a plurality of objects to be labeled may be accumulated, and delivered, one at a time, in the operative relation to said presser head, a pasting mechanism, a label magazine, a gripper mechanism operative to remove labels from said magazine, subject them to said pasting mechanism and deliver them in the operative relation to said presser head, a slide movable transversely of the machine, a finger mounted in said slide and adapted to be projected into engagement with an object positioned in the operative relation to said presser head, a lever operative upon said finger, a rocking plate carried by said slide in engaging relation with said finger, and a link and lever mechanism operative upon said slide and said finger through said rocking plate, whereby after they have been labeled, objects will be moved along said transverse channel and out of the path of movement of other objects in said longitudinally extending channel.

12. A label affixing machine embodying therein a presser head comprising a fitting, a long and a short arm pivotally mounted upon said fitting to have movement about parallel axes, a flat expansible and contractible member extending between the free ends of said arms, a stop member operative upon one of said arms for establishing a normal inoperative relative position of both of said arms, a feeding mechanism for delivering objects to be labeled properly positioned in relation to said presser head, a pasting mechanism, a label magazine, a gripper mechanism operative to remove labels from said magazine, subject them to said pasting mechanism and deliver them in the operative relation to said presser head, and ejecting means operative to remove objects from the operative relation to said presser head after labels have been applied thereto.

13. A label affixing machine embodying therein a presser head comprising a fitting, oppositely movable arms pivotally mounted thereon, a flat expansible member extending between the free ends of said arms, a feeding mechanism for delivering objects to be labeled properly positioned in relation to said presser head, a pasting mechanism, a label magazine, a slide having an upwardly projecting plate, a laterally extending bearing carried by said plate having fixed gripper jaws formed thereon, a shaft mounted in said bearing carrying gripper jaws cooperating with said other gripper jaws, a bell crank lever carried by said shaft, a spring toggle mounted upon said upwardly extending plate and operative upon said bell crank lever, a rod pivotally connected with said bell crank lever and having a laterally projecting cam, a rock shaft having crank arms set upon different horizontal planes and so spaced as to be operative upon said cam to cause a timely closing and opening of the gripper jaws, means imparting timely movement to said rock shaft and ejecting means operative to remove objects from the operative relation to said presser head after labels have been applied thereto.

14. A label affixing machine embodying therein a presser head comprising a fitting, a long and a short arm pivotally mounted upon said fitting to have movement about parallel axes, a band of thick, soft vulcanized, highly elastic rubber extending between the free ends of said arms, a stop member operative upon one of said arms for establishing a normal inoperative relative position of both of said arms, a feeding mechanism for delivering objects to be labeled properly positioned in relation to said presser head, a pasting mechanism, a label magazine, a gripper mechanism operative to remove labels from said magazine, subject them to said pasting mechanism and deliver them in the operative relation to said presser head, and ejecting means operative to remove objects from the operative relation to said presser head after labels have been applied thereto.

15. A label affixing machine embodying therein a presser head comprising a fitting, a long and a short arm pivotally mounted upon said fitting to have movement about parallel axes, an endless thick elastic band passing about both of said arms and extending between the free ends thereof, a stop member operative upon one of said arms for establishing a normal inoperative relative position of both of said arms, a feeding mechanism for delivering objects to be labeled properly positioned in relation to said presser head, a pasting mechanism, a label magazine, a gripper mechanism operative to remove labels from said magazine, subject them to said pasting mechanism and deliver them in the operative relation to said presser head, and ejecting means operative to remove objects from the operative relation to said presser head after labels have been applied thereto.

16. A label affixing machine embodying therein a presser head, a long and a short arm pivotally mounted upon said head to have movement about parallel axes, and an endless relatively thick elastic band completely surrounding both of said arms and extending between the free ends thereof, normally tending to hold the arms in substantially parallel relation but permitting them to separate relative to one another.

17. A label affixing machine embodying therein a reciprocatory presser head, a pair of arms each pivotally mounted on said head with the end of one arm in advance of the other and the free ends of both arms movable toward and from each other, and a flat strip of soft rubber overlying the free ends of said arms and normally tending to hold them in substantially parallel relation.

18. A label affixing machine embodying therein a reciprocating presser head, a pair of arms each pivotally mounted on said head with their free ends extending forward thereof, and a band of thick, soft vulcanized highly elastic rubber overlying and surrounding the free ends of said arms and normally tending to hold them in substantially parallel relation.

19. A label affixing machine, embodying a reciprocating head, a pair of arms each pivotally mounted upon said head with their free ends movable toward and from each other, an endless band of soft rubber completely surrounding said arms and normally tending to hold them in substantially parallel relation, and a support for an article to be labeled located in the path of movement of the said head and arms, the construction and arrangement of parts being such that the said arms will spread and stretch the said band when the latter makes pressure contact with the label during label application.

20. A label affixing machine embodying a reciprocating head, a pair of arms each pivotally mounted thereon and each normally inclined to the path of movement of the head, and a soft rubber strip extending between and overlying the ends of the arms and normally tending to hold them in substantially parallel relation, but permitting them to spread upon contact with the label during label application.

21. A label affixing machine embodying a reciprocating head, a pair of arms each pivotally mounted thereon and each normally inclined to the path of movement of the head and with the end of one arm slightly in advance of the end of the other, and a soft rubber strip extending between and overlying the ends of the arms and normally tending to hold them in substantially parallel relation, but permitting them to spread upon contact with the label during label application.

Signed at Philadelphia in the county of Philadephia and State of Pennsylvania, this thirteenth day of December A. D. 1930.

CHAS. G. MAXWELL.